US005885401A

United States Patent [19]
Eiban

[11] Patent Number: 5,885,401
[45] Date of Patent: Mar. 23, 1999

[54] PROCESS AND AN APPARATUS FOR REMOVING SHRUNK-ON SLEEVES OR ALL-ROUND LABELS FROM VESSELS

[75] Inventor: Gunther Eiban, Regensburg, Germany

[73] Assignee: Krones AG Hermann Kronseder Maschinenfabrik, Germany

[21] Appl. No.: 581,611

[22] PCT Filed: Jun. 1, 1995

[86] PCT No.: PCT/EP95/02086

§ 371 Date: Apr. 19, 1996

§ 102(e) Date: Apr. 19, 1996

[87] PCT Pub. No.: WO95/32814

PCT Pub. Date: Dec. 7, 1995

[30] Foreign Application Priority Data

Jun. 1, 1994 [DE] Germany .......................... 44 19 182.0

[51] Int. Cl.[6] ...................................................... B32B 35/00

[52] U.S. Cl. ............................ 156/344; 156/584; 134/26; 134/95.3; 134/104.4; 134/151

[58] Field of Search .................................... 156/344, 584; 29/402.03, 426.1, 426.4, 426.2, 564.1; 134/26, 32, 95.3, 103.1, 104.4, 151, 165

[56] References Cited

U.S. PATENT DOCUMENTS

| | | | |
|---|---|---|---|
| 2,219,007 | 10/1940 | Dostal | 134/104.4 X |
| 2,314,048 | 3/1943 | Ladewig | 134/104.4 X |
| 3,868,960 | 3/1975 | Cove et al. | 134/104.4 X |
| 4,061,152 | 12/1977 | Babunovic | 134/104.4 X |
| 4,717,442 | 1/1988 | Hopson | 156/344 X |
| 5,217,538 | 6/1993 | Buchholz et al. | 134/104.4 X |
| 5,317,794 | 6/1994 | Lerner et al. . | |
| 5,356,481 | 10/1994 | Yoshimura et al. | 134/26 X |
| 5,372,672 | 12/1994 | Sifert et al. . | |
| 5,373,618 | 12/1994 | Doyle et al. | 29/426.3 |
| 5,442,851 | 8/1995 | Lerner et al. | 156/584 X |
| 5,685,053 | 11/1997 | Deonarine et al. | 156/584 X |

FOREIGN PATENT DOCUMENTS

| | | | |
|---|---|---|---|
| 0130004 | 1/1985 | European Pat. Off. . | |
| 0587358 | 3/1994 | European Pat. Off. . | |
| 4219051 A1 | 12/1993 | Germany . | |
| 4335585 A1 | 4/1995 | Germany . | |
| 249840 | 7/1947 | Switzerland | 134/151 |

*Primary Examiner*—Mark A. Osele
*Attorney, Agent, or Firm*—Tilton, Fallon, Lungmus & Chestnut

[57] ABSTRACT

The invention relates to a process and a device for removing shrinking casings or encircling labels from containers, particularly bottles, glasses, cans, or the like, in which, first of all, a separating line which proceeds essentially transversely to the direction of circumference is produced and the shrinking casing or the encircling label is then removed by means of a fluid stream which is directed against the container. During the removal of an encircling label or of a shrinking casing which has been cut through, the containers are preferably held, in a bottom-free manner, near the area of the head, and at least one fluid stream is directed, in an angular manner, from above, essentially axially to the wall of the container, against the container, and preferably above the upper edge of the shrinking casing or of the encircling label.

29 Claims, 5 Drawing Sheets

PROCESS AND AN APPARATUS FOR REMOVING SHRUNK-ON SLEEVES OR ALL-ROUND LABELS FROM VESSELS

DESCRIPTION

This invention relates to a process and to an apparatus for removing shrunk-on sleeves or all-round labels from vessels according to the precharacterising clause of claim 1 and to the precharacterising clause of claim 10, respectively.

Processes for removing shrunk-on sleeves or all-round labels surrounding vessels are already known in which a parting line is first produced substantially transverse to the circumferential direction of a shrunk-on sleeve or an all-round label. Attempts are then made to blow off the cut-through all-round label or the shrunk-on sleeve by fluid jets (compressed air, water jets) aligned substantially radially in relation to the vessel outer wall (EP 0 587 358 A1) or to remove them by suction from the vessel outer wall by means of suction devices. In this respect it has been shown in particular that the detachment of the labels or shrunk-on sleeves after producing the parting line creates difficulties.

Accordingly, the underlying object of the present invention is to provide a process and an apparatus which permit improved detachment of the labels or shrunk-on sleeves.

This object is achieved with respect to the process by the characterising features of claim 1 and is achieved with respect to the apparatus by the characterising features of claim 10.

The production of a parting line in the covering material (all-round label, shrunk-on sleeve) can be effected in the known manner, e.g. by means of a cutter blade or a high-pressure water jet, for which purpose the vessels are preferably held clamped axially between their top and their bottom face on a conveyor device, generally on a continuously drivable turntable. After the parting line is produced, the vessels, e.g. drinks bottles made of plastics (PET) are held as far as possible in the region near their mouths with their bases free, so that the covering material is removed by fluid jets which are aligned obliquely from above, substantially axially in relation to the vessel outer wall, and which impinge at high pressure on the vessel outer wall, preferably above the top edge of the covering material.

Because the vessels are suspended with their bases free, the detached covering material can be conveyed away without problems and in a trouble-free manner.

The process and the apparatus which is suitable therefor can be used particularly advantageously in beverage filling lines for returnable bottles, particularly plastics bottles (PET), which have a neck collar below their mouths. The neck collar facilitates ease of handling of the bottles during the detachment of the covering material.

The fluid jets can be produced by compressed air and/or water. When water or another suitable liquid is used, a closed circuit can be produced by capturing the floated-off covering material and the liquid underneath the bottles, separating the covering material and feeding it to a press for compaction, for example, and feeding the liquid collected in a container to the nozzles for re-use, by means of a pump. Prior purification of the liquid by filtration or other measures is optionally effected. Moreover, cleaning substances may be admixed with the liquid in order also to effect a preliminary cleaning of the outside of the bottles during the removal of the covering material.

According to a further embodiment, it is particularly advantageous if the vessels are rotated about their vertical axes during the impingement of the fluid jets on their outsides, so that substantially almost the whole periphery of a bottle is impinged upon by fluid, even if fixed jet nozzles are used. In this respect it is advantageous if a plurality of jet nozzles are disposed in succession along both sides of the path of movement of the bottles, preferably with decreasing height as seen in the direction of conveying. It may also be advantageous to cause the individual fluid jets to impinge on the bottle walls at different angles, and preferably to fasten the jet nozzles so that they are adjustable.

Other advantageous forms of the process and of the apparatus are given in the subsidiary claims.

A preferred embodiment is described below with reference to the Figures, where:

Figure 1:
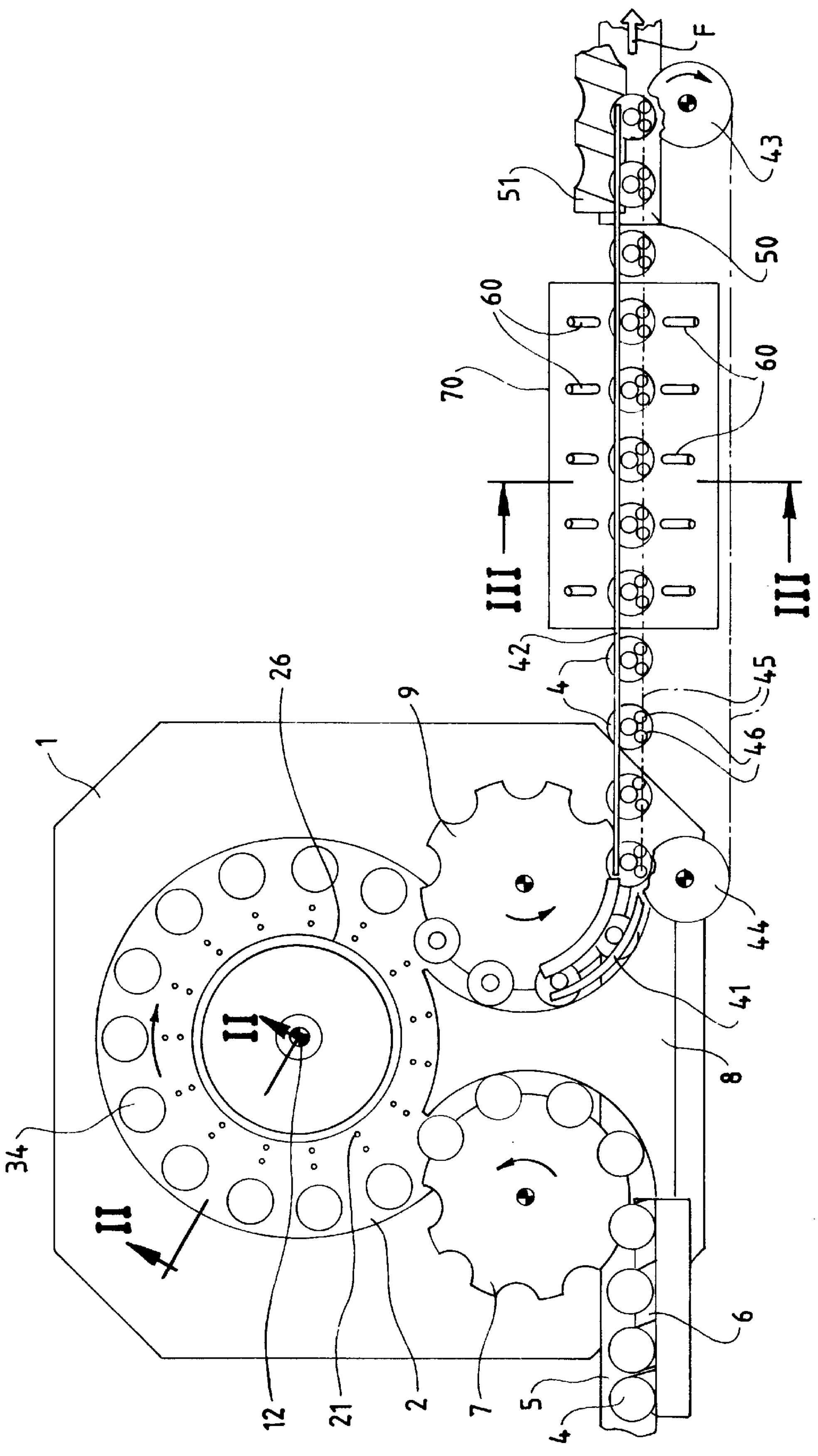
FIG. 1 is a schematic plan view of a machine for removing covering material.

The machine for removing covering material which is schematically illustrated in FIG. 1 comprises a table plate 1, on which a continuously drivable turntable 2, which has an associated input star wheel 7 and an output star wheel 8, is rotatably mounted. An input conveyor belt 5 with a one-piece screw 6 is associated with the input star wheel 7 for feeding the bottles 4 to be processed. The one-piece screw is driven synchronously in a positionally correct manner with respect to the turntable 2, as are the feeder belt 5, the input star wheel 7 and the output star wheel 8. A curved guide sector 8 is situated between the input star wheel 7 and the output star wheel 9. Two curved guide rails 40 and 41, which together form a guide slot for guiding the tops of the bottles through, are disposed fixed above the output star wheel 9. The inside width of the guide slot is slightly greater than the outside diameter of the top of a bottle. A straight friction strip 42, which is held fixed, adjoins the guide rail 40, and extends as far as a discharge conveyor 50 with an associated discharge conveyor screw 51. A chain 45 which can be driven synchronously with the output star wheel 9 via chain wheels 43 and 44 is disposed opposite and at a distance from the friction rail, and carries rollers 46, which are each freely rotatably mounted in pairs with a uniform spacing.

A plurality of jet nozzles 60 is disposed in succession along both sides of the rectilinear conveying path of the bottles in the region between the output star wheel 9 and the discharge conveyor belt 50. A catchment hopper 70 is disposed in the region of the jet nozzles 60, underneath the bottles 4, which are suspended, with their bases free, between the output star wheel 9 and the discharge conveyor belt 50 (FIG. 3).

Figure 2:
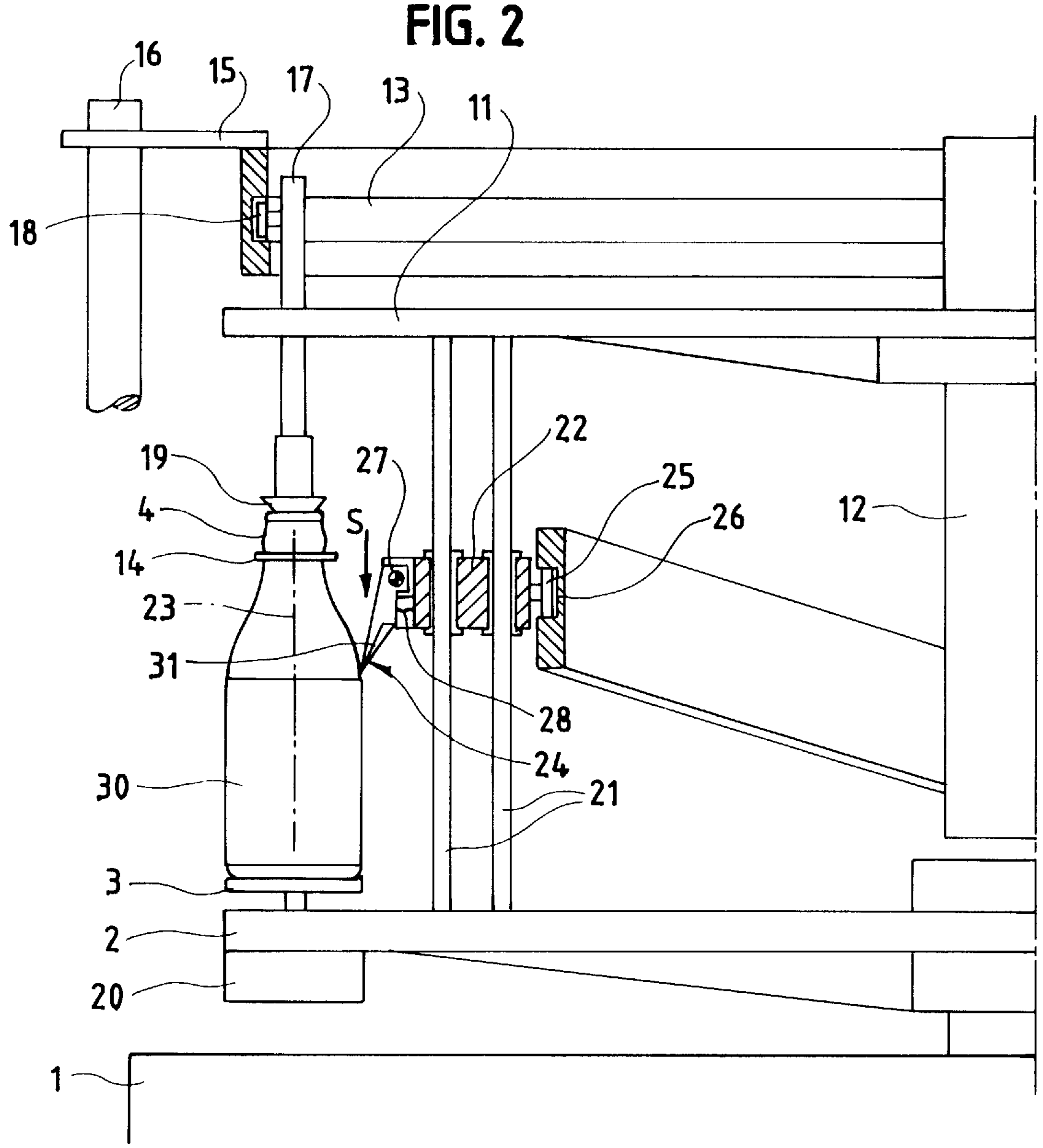
FIG. 2 is a vertical partial section along section line II—II through the machine illustrated in FIG. 1.

The turntable 2 (FIG. 2) carries a plurality of uniformly spaced bottle plates 3, which are disposed on a reference circle. These bottle plates 3 can be rotatably mounted on the bottle table 2, and their rotational position can be manipulated by an associated drive 20 (servomotor, cam control system or the like). As can be seen from FIG. 2, a carrier disc 11, which is not shown in FIG. 1, is disposed at a distance above the turntable 2 and parallel thereto, and is attached rotationally fixed to a central shaft 12 driven in rotation, as is the turntable 2. Raisable and lowerable centring cones or cups 19, which are aligned with the bottle plates 3, are disposed at the periphery of the carrier disc 11. Each centring cone 19 is freely rotatably mounted at the lower end of a guide rod 17, which is mounted so that it can slide up and down at the periphery of the carrier disc 11 and is equipped with a cam roller 18 at its upper end. This cam roller 18 engages with positive fit in a radial cam 13 which is held stationary by means of a holding pillar 16 and an extension arm 15.

Two guide rods 21, which are aligned parallel to the vertical axis 23 of the bottle 4, are fixed between the turntable 2 and the carrier disc 11 disposed above the latter, radially inwardly of the path of circulation of the bottle 4, which is held axially clamped between its mouth and its bottom face. A support body 22 is displaceably mounted on these guide rods 21. The support body has a cam roller 25 on its side facing radially inwards towards the central shaft 12, which cam roller engages with positive fit in a radial cam 26 which is held stationary. The support body 22 is provided with a slot on its side facing radially outwards towards the bottle 4, in which slot a horizontal bearing axis 27 is disposed on which a cutter 31 is swivel-mounted. The cutter is permanently acted upon by a pressure spring 28 towards the outer curved surface of the bottle 4. The cutter 31 has a cutting edge 24 which points radially outwards away from the curved surface of the bottle 4. The arrangement of the cutter 31 is selected so that the point of the cutter is pressed against the curved surface by the pressure spring 28, the radial cam 26 being constructed so that the point of the cutter 31 is placed above the top edge of the all-round label or the shrunk-on sleeve 30 adhering to the bottle 4 and is subsequently moved downwards in the cutting direction S. During this downward movement the point of the cutter penetrates between the curved surface of the bottle 4 and the back of the label 30. The label is cut through from back to front by the outwardly oriented cutting edge 24. The axial parting line which is produced in the label 30 runs substantially parallel to the vertical axis 23 of the bottle 4. Instead of the cam roller 25 and radial cam 26 illustrated, the up and down movement of the cutter 31 may also be produced by any other suitable operating device, e.g. a controlled pneumatic cylinder.

Figure 3:
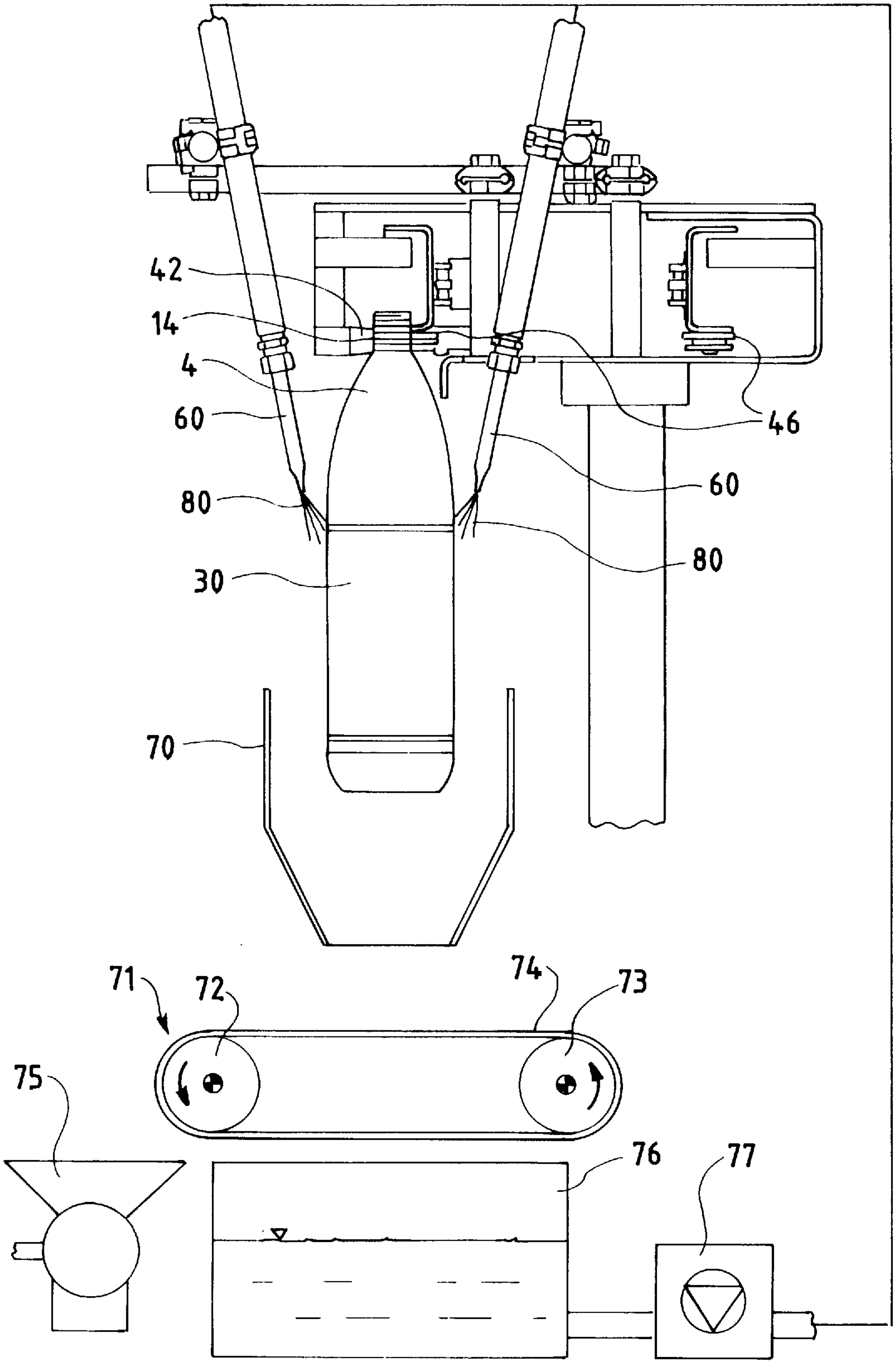
FIG. 3 is a vertical section along line III—III through the machine illustrated in FIG. 1.

Detachment of the labels or shrunk-on sleeves 30, which have already been cut through transverse to their circumferential direction, is effected in the detachment station which is illustrated in FIG. 3 as seen in the direction of conveying. The bottles 4 are held radially at their top regions between the fixed friction rail 42, which is provided with a continuous longitudinal channel, and an opposing pair of rollers 46. The freely rotatable rollers 46 have a groove extending over their entire circumference which serves to receive the neck collar 14 situated underneath the mouth of the bottle 4. This neck collar 14 is also seated in the friction rail 42 by means of the aforementioned channel. Below the neck collar 14, the entire curved surface of the bottle 4, which is suspended with its base free, is accessible to the fluid jets 80 which are discharged obliquely from above by the jet nozzles 60. The fluid jets 80 impinge at an acute angle on the curved surface of the freely suspended bottle 4, preferably above the top edge of the cut-through label 30, so that at least part of the fluid can penetrate between the vessel outer wall and the back of the label, due to which the label 30 is rapidly and reliably detached. Pressurised water jets are preferably used as the fluid jets 80.

The water flowing downwards from the bottle outer wall and the labels 30 detached from the bottle 4 are collected by a catchment hopper 70 disposed under the bottles 4, which hopper is open at the bottom, and are delivered on to a label extraction device 71 disposed underneath. The label extraction device 71 consists of a screen belt 74 or the like, which is guided over two drivable rollers 72 and 73 and which is permeable to water. Water flowing off from the catchment hopper 70 can thereby drip off unimpededly into a collecting vessel 76, which is open at the top and which is situated under the screen belt 74, whilst the separated labels 30 are discharged laterally into the hopper of a label press 75. The water collected in the container 76 is withdrawn by a pump 77 and fed to the jet nozzles 60 again.

Figure 4:
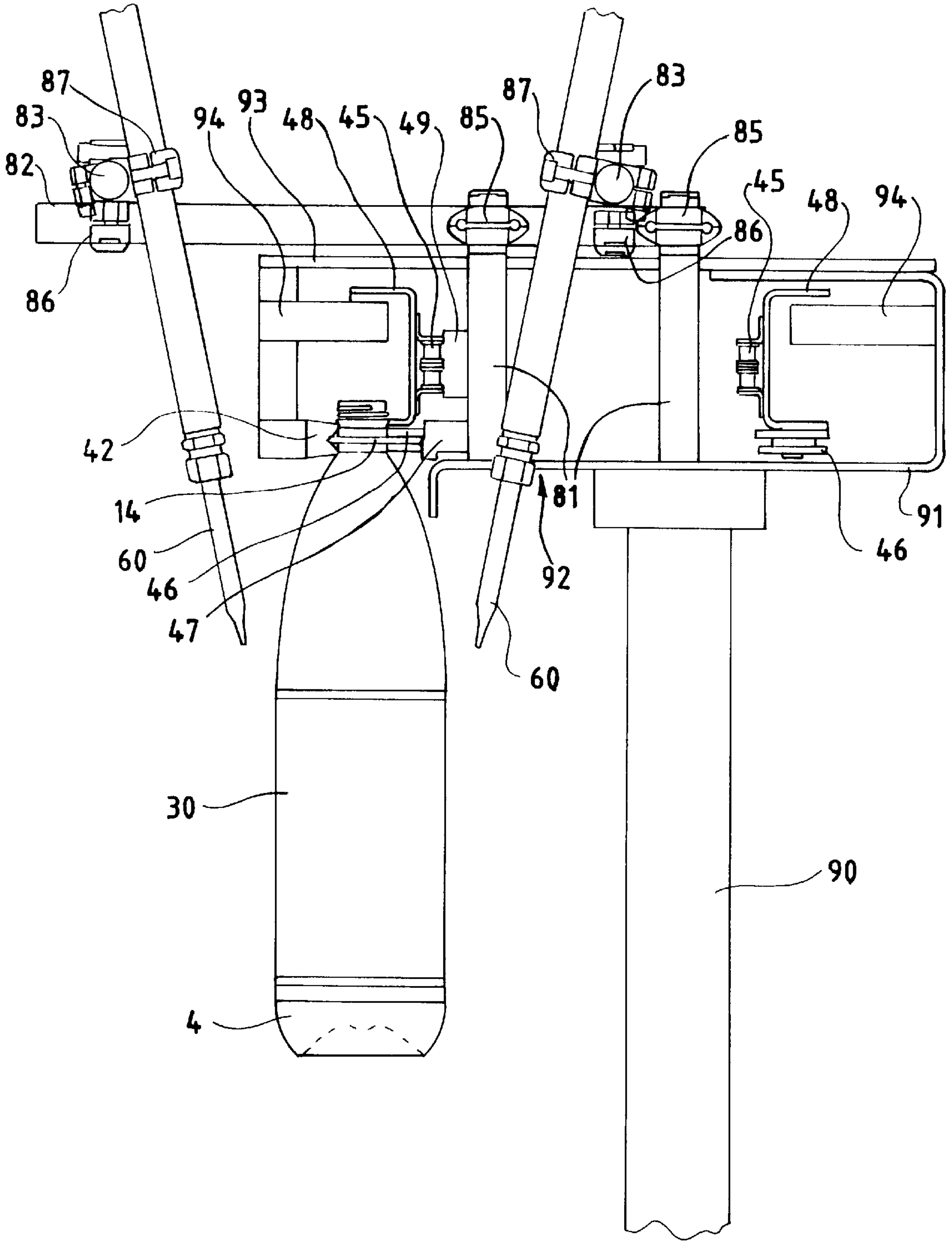
FIG. 4 is an enlarged sectional illustration of the bottle holding device depicted in FIG. 3.

The construction of the chain 45 for conveying the bottles from the output star wheel 9 to the discharge conveyor 50, which was merely indicated schematically in FIG. 1, can be seen in detail from the vertical section illustrated in FIG. 4. A support 91, which comprises multiple bends and which extends from the deflection chain wheel 44 as far as the drive chain wheel 43 (FIG. 1) is fixed to a plurality of supporting pillars 90 disposed in succession along one side of the conveying path of the bottles. A plurality of transverse arms 93 is disposed at a distance above the path of the mouths of the bottles. The transverse arms are disposed in succession on the top face of the support and serve for the fixed mounting of the friction rail 42 and of a sliding rail 94 disposed above the latter. A second, opposing sliding rail 94 which extends horizontally is associated with this sliding rail 94 at the same height on the support 91. Stirrups 48 bent into a U-shape are fixed with a uniform spacing to the roller chain 45, which circulates in a horizontal plane. Each of the stirrups carries two freely rotatable rollers 46 on its lower limb for receiving the neck collar 14 of a bottle 4, and the upper limb of the stirrup slides on the top face of the sliding rails 94. The lower limb has a recess, which is not illustrated, between the rollers 46 for the top of the bottle. So that a bottle mouth which is rotatably clamped between a pair of rollers 46 and the friction rail 42 is guided accurately and reliably, a supporting rail 47; 49 for the rollers 46 and the roller chain 45, respectively, is fixed to the support 91.

Figure 5:
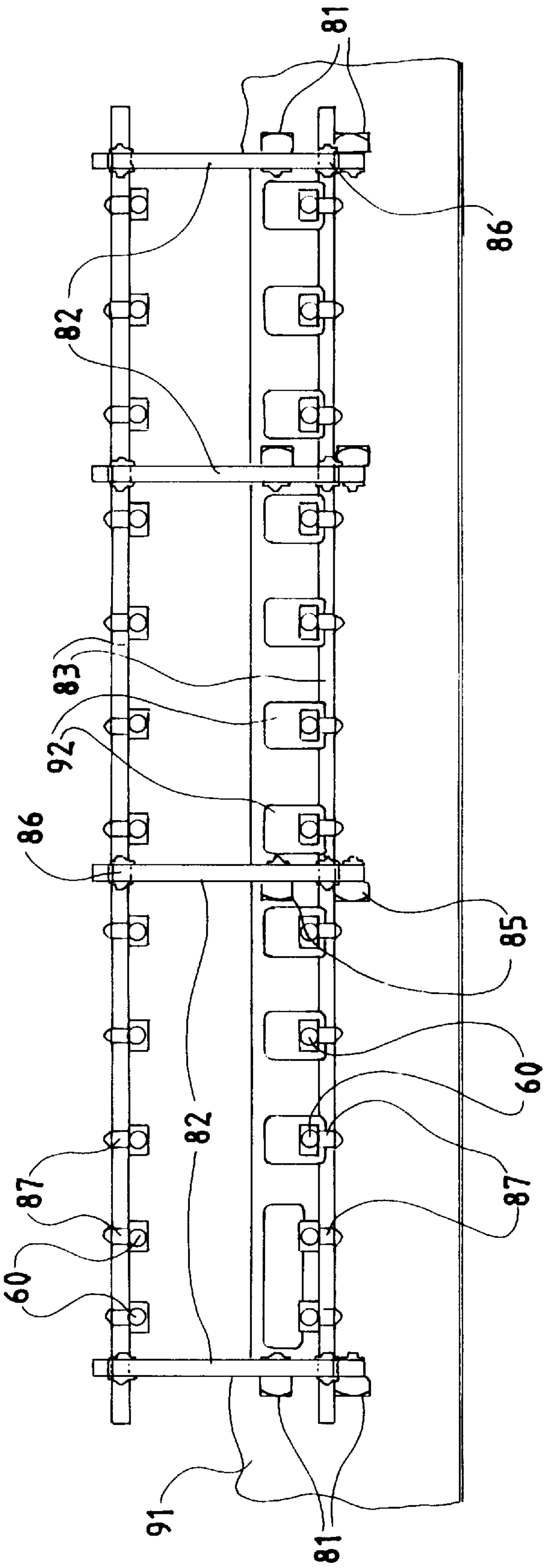
FIG. 5 is a plan view of the mounting system for the jet nozzles depicted in FIGS. 3 and 4.

A plurality of vertical round rods 81, which are each disposed side by side in pairs and are displaced in succession in the direction of conveying, is rigidly fixed to the support 91 for mounting the jet nozzles 60 (FIG. 5). A horizontally aligned transverse rod 82 is adjustably mounted on each of these pairs of rods with the aid of clamping pieces 85. Longitudinal rods 83, which extend in the direction of conveying F and to which the jet nozzles 60 are fixed by means of clamping pieces 87, are mounted on these transverse rods 82, again by means of clamping pieces 86 (FIG. 5). The said clamping pieces each have two receiver bores which cross each other at right angles on offset planes, by means of which both the angle of the jet nozzles 60 to the bottle outer wall and the vertical position of the jet nozzles 60 can be continuously adjusted. In addition, the lateral distance between two opposing jet nozzles 60 can also be adjusted continuously by the clamping pieces 86 to match the width of the bottle. The jet nozzles 60 can be adjusted so that the fluid jets 80 emerging from jet nozzles 60 which are disposed in succession as seen in the direction of conveying impinge on the bottle outer wall at decreasing heights and/or at different angles. It can also been seen from FIG. 5 in combination with FIG. 4 that window-like apertures 92 are present in the longitudinal support 91 through which the nozzles 60 are passed.

The operating sequence for a bottle passing through the machine is described below by way of example.

A bottle 4 provided with an overlapping all-round label 30 which is partially adhesively bonded to its outer wall is conveyed from the feeder conveyor 5 to the one-piece screw 6, carried by the latter on to the machine portion and introduced into a receiver pocket of the star wheel 7. In cooperation with the curved guide sector 8, the star wheel 7 conveys the bottle 4 on to a bottle plate 3 of the turntable 2, whereupon the bottle 4 is simultaneously clamped axially between its mouth and bottom face by the centring cone 19 being lowered. The spring-loaded cutter 31 seated against the outside of the bottle 4 is then moved axially on the bottle wall from the top edge of the label to the bottom edge of the label, whereupon the cutter point penetrates between the outside of the bottle and the back of the label and the label 30 is cut through from the back of the label by the cutting edge 24, which points away from the outside of the bottle. The cutter 31 is then moved back upwards again into its original starting position for the next cutting operation. As soon as the bottle 4 with the label 30 which has been cut through transverse to its circumferential direction enters the output star wheel 9, the centring cone 19 is raised from the bottle mouth, due to which the axial clamping operation is terminated. The top of the bottle 4 is introduced into the gap between the guide rails 40 and 41 by the output star wheel 9, whereupon the guide rails engage below the neck collar 14 of the bottle and slightly raise the bottle during its forward movement in the output star wheel 9. The neck collar 14 of the bottle 4 is accurately introduced into the channel of the friction rail 42 and the groove in the rollers 46 by means of the guide rails 40 and 41, whilst at the same time a pair of rollers 46 is swung round past the friction rail 42 by the deflection wheel 44 at the end of the guide rail 41. In this operation the neck collar 14 of the bottle 4 is radially rotatably clamped at three points on its circumference. The bottle 4 is rolled, rotating anti-clockwise, along the friction rail 42 due to the forward movement of the chain 45 in the direction of conveying F.

Compressed air is blown obliquely from above by the first pair of jet nozzles 60, at an acute angle on to the top edge of the all-round label which has already been cut through, in order to create a gap between the label and the bottle outer wall. Water under high pressure is discharged by the jet nozzles 60 which follow in the direction of conveying F. The water likewise impinges obliquely from above on the bottle wall and detaches the label from the bottle 4, which is suspended at its neck collar 14 with its base free. The detached label 30 and the water which runs off the bottle are fed by the catchment hopper 70 to the label extraction device disposed 71 underneath, and the water is introduced into the collecting vessel 76 (FIG. 3). The bottle 4, which is now free from its label, is introduced into the conveyor screw 51, which is driven synchronously with the chain 45, and is held and prevented from falling over by the conveyor screw whilst the neck collar 14 is released at the end of the friction rail 42. The bottle, which is now standing with its bottom face on the discharge conveyor belt 50, is subsequently conveyed away, e.g. to a bottle washing machine.

What is claim is:

1. A process for removing shrunk-on sleeves or all-round labels (30) from vessels (4), wherein a parting line substantially transverse to the circumferential direction is first produced and the shrunk-on sleeve or the all-round label (30) is then removed by a fluid jet (80) directed on to the vessel (4), the improvement comprising that, said parting line is produced during conveyance of said vessels along a first conveyor (2) with each of said vessels being in an upright position and having a base standing on said first conveyor, then said vessels are transferred to a second conveyor (45, 42), and during the removal of a cut-through shrunk-on sleeve or a cut-through all-round label (30), while said vessels are being conveyed along said second conveyor, the vessels (4) are continuously transported single-file and are held with their bases free, and at least one fluid jet (80) is directed obliquely from above on to said vessel, substantially axially in relation to the outer wall of said vessel, preferably above the top edge of said shrunk-on sleeve or of said all-round label (30).

2. A process according to claim 1, wherein water jets are used as said fluid jets (80).

3. A process according to claim 1, wherein said fluid used for spraying and which runs off said vessels (4) is captured, said labels (30) or shrunk-on sleeves are separated, and said fluid is collected in a container (76).

4. A process according to claim 3, wherein said separated labels (30) or shrunk-on sleeves are pressed.

5. A process according to claim 3, wherein said fluid is re-used for spraying said vessels (4).

6. A process according to claim 1, wherein said vessels (4) are led past a plurality of said fluid jets (80) which are fixed in a displaced arrangement, and said fluid jets impinge in particular at different heights and/or at different angles on the walls of said vessel.

7. A process according to claim 6, wherein two rows of said fluid jets (8) parallel to the direction of conveying (F) of said vessels (4) are directed from two sides on to said vessel outer walls.

8. A process according to claim 1, 2, 3, 4, 5, 6 or 7, wherein during the impingement by said fluid jets (80) said vessels (4) are rotated about their vertical axes (23).

9. A process according to claim 1, 2, 3, 4, 5, 6 or 7, wherein said vessels comprise bottles (4) equipped with a neck collar (14) and are held at said neck collar (14) with a positive fit during the impingement by said fluid jets (80).

10. A process according to claim 6, wherein said plurality of said fluid jets (80) are fixed in a displaced arrangement and the vessels are continuously moved past said jets.

11. A process according to claim 6, wherein said two fluid jets from both sides impinge substantially simultaneously on said vessels (4).

12. A process according to claim 1, wherein said vessels (4) comprise bottles, glasses, or cans.

13. A process according to claim 12, wherein said bottles comprise plastic bottles.

14. A process according to claim 1, wherein said vessels (4) are held near their top region.

15. A process according to claim 1, wherein compressed air jets are used as said fluid jets.

16. A process according to claim 1, wherein said vessel is impinged upon first by compressed air and subsequently by water.

17. An apparatus for removing shrunk-on sleeves or all-round labels (30) from vessels (4), particularly bottles, glasses, cans or the like, wherein a parting line running substantially transverse to the circumferential direction is first produced by means of a cutting device (31) and a shrunk-on sleeve or an all-round label (30) is subsequently removed by a fluid jet (80) directed on to the vessel (4), the improvement comprising a first conveyor for conveying said vessels positioned upright on their bases and each of said vessels having its base standing on the first conveyor during production of said parting line, a second conveyor to which said vessels are transferred after production of said parting line, and drivable holding device means (45, 46) for holding the vessels (4) being conveyed continuously in single-file along said second conveyor with their bases free, and at least one nozzle means (60) for discharging fluid jets (80)

obliquely from above, said nozzle means being aligned substantially predominantly axially in relation to the outer walls of said vessel.

18. An apparatus according to claim 17, wherein said drivable holding device means is formed from a continuously drivable traction mechanism (45) with carriers (46) fastened thereto, which holds said vessel (4) underneath and near its mouth.

19. An apparatus according to claim 18, wherein said carriers are each constructed as rollers (46) fastened freely rotatably in pairs to said traction mechanism (45), said rollers are provided with a groove and are associated with an opposing fixed friction rail (42) having a continuous channel and disposed with an intermediate spacing.

20. An apparatus according to claim 17, 18, or 19, wherein said nozzle means comprises a plurality of nozzles displaced in succession along said drivable holding device means (42, 45) in the direction of conveying (F), and opposite each other transverse to said direction of conveying.

21. An apparatus according to claim 18, wherein said traction mechanism holds a vessel having an existing neck collar (14).

22. An apparatus according to claim 17, wherein a catchment device (70) is present in the region of said plurality of nozzles for the fluid dripping off and for the detached labels (30), and said fluid and said detached labels (30) are fed to a label separation device (71).

23. An apparatus according to claim 22, wherein said separated labels (30) are fed to a label press (75).

24. An apparatus according to claim 22, wherein said fluid is led into a collecting tank (76) for re-use.

25. An apparatus according to claim 24, wherein said fluid can be fed under high pressure from said collecting tank (76) to said plurality of nozzles (60) by means of a pump (77).

26. An apparatus according to claim 17, 18, 19, 22, 23, 24 or 25, wherein water is used as said fluid.

27. An invention according to claim 22, wherein said label separation device comprises a drivable screen belt (74).

28. An apparatus according to claim 17, wherein said drivable holding device means (45, 46) hold said vessels (4) near their top regions, such that said vessels are held suspended with their bases free.

29. An apparatus according to claim 17, wherein said fluid jets impinge on said vessel outer walls above the top edge of the said shrunk-on sleeve or of said all-round label (30).

* * * * *